United States Patent [19]
De Ceuster et al.

[11] 3,945,910
[45] Mar. 23, 1976

[54] DIAPHRAGM FOR AN ELECTROLYSIS CELL

[75] Inventors: Jean De Ceuster, Vilvoorde, Belgium; Bruno Grassi, Rosignano-Solvay, Livorno, Italy

[73] Assignee: Solvay & Cie, Belgium

[22] Filed: June 13, 1974

[21] Appl. No.: 478,973

[30] Foreign Application Priority Data
June 15, 1973 Belgium .............................. 132292

[52] U.S. Cl. ................................ 204/296; 162/155
[51] Int. Cl.² ...................... C25B 13/00; C25C 7/04
[58] Field of Search .................. 204/298, 301, 296; 162/155

[56] References Cited
UNITED STATES PATENTS

| | | | |
|---|---|---|---|
| 3,097,990 | 7/1963 | Holly | 162/155 X |
| 3,235,473 | 2/1966 | LeDuc | 204/30 |
| 3,282,875 | 11/1966 | Connolly et al. | 204/296 X |
| 3,441,472 | 4/1969 | Foster | 162/155 X |
| 3,505,200 | 4/1970 | Grotheer | 204/295 |
| 3,583,891 | 6/1971 | Hacker et al. | 204/295 X |
| 3,694,281 | 9/1972 | LeDuc | 162/155 X |
| 3,702,267 | 11/1972 | Grot | 204/295 X |

*Primary Examiner*—T. Tung
*Assistant Examiner*—A. C. Prescott
*Attorney, Agent, or Firm*—Robert E. Burns; Emmanuel J. Lobato; Bruce L. Adams

[57] ABSTRACT

Diaphragms for a cell, in which the electrolysis of an aqueous solution of an alkali metal is carried out, having good permeability, shape and dimensional stability and good wettability characteristics with respect to the electrolyte are disclosed as well as a method for the manufacture thereof. The diaphragms are composed of a mixed sheet of a substantially homogeneous mixture of amphibole asbestos fibers and polyvinylidene fluoride fibrils connected together. To manufacture the diaphragms, an intimate mixture of polyvinylidene fluoride fibrils and amphibole asbestos is formed into a sheet and the sheet is heated to cause surface fusion of the fibrils.

12 Claims, 2 Drawing Figures

DIAPHRAGM FOR AN ELECTROLYSIS CELL

BACKGROUND OF THE INVENTION

The present invention relates to a diaphragm for use in a cell for the electrolysis of an aqueous solution of an alkali metal halide.

In the known diaphragm cells, in particular the cells for the electrolysis of a sodium chloride brine, the diaphragm is generally made of a layer or a sheet of asbestos, laid on a foraminous structure of iron, which forms the cathode of the cell.

The variety of asbestos generally used is chrysotile, because this gives the diaphragm good cohesion and, consequently, good mechanical resistance.

The known chrysotile diaphragms nevertheless have the disadvantage of dimensional instability with the passage of time. At the start of electrolysis these known diaphragms tend to swell, this swelling being followed by progressive consolidation under the effect of the hydrostatic pressure ruling in the cell. These variations with the passage of time in the volume and shape of the diaphragm are unfavorable to the electrolysis. Furthermore, they have a detrimental influence on the geometry chosen for the cell. In particular, the swelling of the diaphragm at the start of its life necessitates the provision in the cell of anodecathode separations distinctly greater than the optimum value for a cell in a normal condition.

Chrysotile diaphragms also have thhe disadvantage of rapid deterioration in contact with acid electrolytes.

In order to overcome this last disadvantage, it has been proposed in U.S. Pat. No. 3,505,200 to make diaphragms of anthophyllite alone or in admixture with chrysotile. Although the anthophyllite variety of asbestos has good resistance to acids, nevertheless diaphragms of pure anthophyllite are difficult to use in electrolytic cells because of their lack of cohesion. The addition of chrysotile to the anthophyllite substantially improves the cohesion of the diaphragm, but to the detriment of its resistance to acids.

These known diaphragms based on anthophyllite also suffer from the disadvantage, already mentioned above for chrysotile diaphragms, in that they change in volume and shape in the course of electrolysis.

In order to increase the cohesion of asbestos diaphragms and to improve their stability as to shape and dimensions, it has been proposed, in West German Patent Application No. 2,140,714, to coat the asbestos fibers of the diaphragm with a binding agent containing a fluorinated resin. In these known diaphragms, the presence of the resin, dispersed between the asbestos fibers, has however the highly disadvantageous effect of reducing significantly the permeability of the diaphragm. Thus, in this known diaphragm an acceptable cohesion can be obtained only with sacrifice of permeability or, conversely, an acceptable permeability of the diaphragm can be obtained only at the expense of the cohesion and the stability of shape and dimensions of the diaphragm.

SUMMARY OF THE INVENTION

The present invention overcomes these disadvantages of the known diaphragms.

We have now in fact found a diaphragm which has the feature of combining advantageous properties, which up to now were thought to be incompatible: to have a good permeability, good stability of shape and dimensions, and good wettability by the electrolyte. These advantageous properties of the diaphragm according to the invention ease the process of electrolysis, particularly the disengagement of the gas at the anodes. They also permit the construction of cells with a smaller separation between the electrodes.

According to the present invention there is provided a diaphragm for a cell for the electrolysis of an aqueous solution of an alkali metal halide, the diaphragm comprising a mixed sheet formed of a substantially homogeneous mixture of fibers of amphibole asbestos and fibrils of polyvinylidene fluoride connected together.

Also according to the present invention, a method for manufacturing the diaphragm is provided, which comprises forming a mixed diaphragm sheet by intimately mixing fibrils of polyvinylidene fluoride with fibers of amphibole asbestos, forming the mixture into a sheet, heating the sheet to a temperature of about 200°C. to 280°C. so as to cause surface fusion of the fibrils in the sheet and allowing the sheet to cool.

BRIEF DESCRIPTION OF THE DRAWINGS

The FIGURES illustrate schematically, in enlarged vertical cross-section, a horizontal cathode screen having a diaphragm of the invention thereon.

DESCRIPTION OF THE PREFERRED EMBODIMENTS

Figure 1:
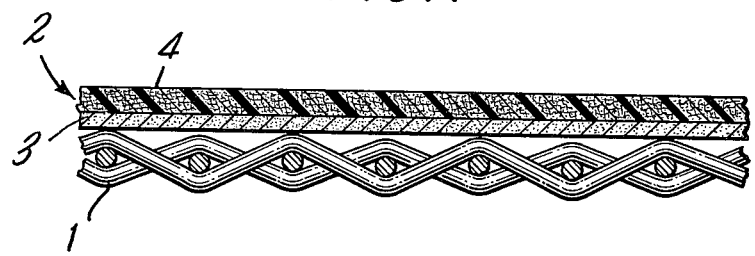

By "amphibole asbestos" we mean, for example, crocidolite and anthophyllite.

The fibrils used in the present invention are specific structures of the polymeric material, disclosed in Belgian Patent Nos. 787,032 and 787,033 which correspond to U.S. application, Ser. Nos. 277,033 and 277,032 filed on Aug. 1, 1972 and which are incorporated herein by reference. The fibrils have a flaky appearance and an elongated shape, and they consist of a plurality of very fine filaments which are in the form of thin ribbons having a thickness of less than 4 microns, generally of the order of one micron. The filaments are interconnected at irregular intervals, so as to form a three-dimensional network. In the aggregate or network, the fine elemental filaments are often rolled or folded, sometimes giving the appearance of a fibrous material. The fibrils have lengths between 0.5 mm. and 50 mm. approximately and thicknesses between 0.01 mm. and 5 mm. approximately; they are characterized by a high specific surface, greater than 1 m.$^2$/g. and even, in some cases, greater than 10 m.$^2$/g.

Fibrils used in the diaphragm of the invention may be manufactured by subjecting a two-phase liquid mixture of molten polymer, such as polyvinylidene fluoride and solvent which is at elevated temperature and pressure to an abrupt pressure release in order to effect the instantaneous vaporization of the solvent and the solidification of the polymer. A make-up fluid is introduced through the two-phase liquid mixture, during or before the abrupt pressure rlease. The "two-phase liquid mixture" refers to a polymer-solvent mixture which is in the form of a single homogeneous liquid phase at high pressure and temperature, but which, when the pressure is gradually reduced, separates from a particular pressure onwards, into a system of two liquid phases; the two liquid phases consist of a continuous liquid phase poor in polymer and in which there is dispersed a second liquid phase, in the form of droplets, which is rich in polymer.

In the diaphragm according to the invention, the fibrils of the diaphragm sheet are connected together in known manner, for example by superficial fusion and adhesion.

In an advantageous embodiment of the diaphragm according to the invention, the content of fibrils of polyvinylidene fluoride in the mixed sheet lies between 10% and 80%, preferably between 20% and 50%, by weight of the mixture.

The weight of the mixed diaphragm sheet according to the invention is preferably between about 350 and about 650 g./m.$^2$. The thickness of the mixed diaphragm sheet is preferably between about 0.3 mm. and about 0.8 mm.

In a preferred embodiment of the diaphragm according to the invention, the aforesaid mixed sheet containing the mixture of amphibole asbestos and fibrils of polyvinylidene fluoride is superimposed on a sheet of chrysotile asbestos and fixed or bonded to this sheet. In this embodiment the sheet of chrysotile asbestos may have a permeability substantially equal to or, preferably, higher than that of the mixed sheet. Preferably the chrysotile sheet has a thickness between about 0.2 and about 0.5 mm. and a permeability between about 0.8 and about 3.5 h.$^{-1}$; the permeability being defined by the relationship:

$$K = \frac{Q}{S.H}.$$

where
$Q$ denotes electrolyte flow rate through the diaphragm in cm.$^3$/h.,
$S$ denotes the working cross-section of the diaphragm in cm.$^2$, and
$H$ denotes the hydrostatic pressure of the electrolyte (expressed as cm. depth of the electrolyte).

In the preferred embodiment of the diaphragm according to the invention, the sheet of chrysotile asbestos increases the rigidity of the diaphragm. This embodiment finds a special application in cells with horizontal foraminous cathodes, where the sheet of chrysotile asbestos, placed against the cathode, supports the mixed sheet containing the mixture of amphibole asbestos and fibrils of polyvinylidene fluoride, and prevents the mixed sheet from settling into the apertures of the cathode.

According to a variant of the preferred embodiment of the diaphragm according to the invention, the mixed sheet containing the mixture of amphibole asbestos and fibrils of polyvinylidene fluoride is held, sandwiched between two sheets of chrysotile asbestos and is bonded to these.

Within the scope of the present invention there is also provided a method for the manufacture of a diaphragm, which comprises forming a mixed diaphragm sheet by intimately mixing 10% to 80% by weight of fibrils of polyvinylidene fluoride with correspondingly 90% to 20% by weight of fibers of amphibole asbestos, forming the mixture of fibrils and fibers into a sheet, heating the sheet to a temperature between about 200°C. and about 280°C. so as to cause surface fusion of the fibrils in the sheet and then allowing the sheet obtained to cool.

While the sheet is being heated, which may take from 5 to 15 minutes, the mixture of fibers and fibrils in the sheet may advantageously be compressed.

According to one embodiment of the method of the invention, the sheet formed from the mixture of fibers and fibrils is compressed, while being heated, against at least one sheet of chrysotile asbestos, or preferably between two sheets of chrysotile asbestos.

According to a preferred embodiment of the method of the invention, after the mixed sheet containing the mixture of amphibole asbestos and fibrils has been cooled, it is contacted with at least one sheet of chrysotile asbestos, or preferably it is inserted between two sheets of chrysotile asbestos, and the assembly of sheets is heated to a temperature between about 200°C. and about 280°C. for about 3 hours. Preferably the sheets are pressed against each other during this heating step.

The last-mentioned manner of carrying out the method of the invention has the advantage of improving the cohesion and the rigidity of the diaphragm.

Figure 2:
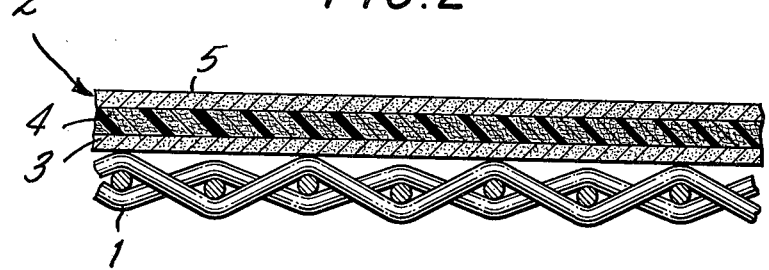

The drawings concern chlorine-alkali horizontal diaphragm cells. FIGS. 1 and 2 illustrate schematically an enlarged vertical cross-section of a horizontal cathode screen 1, having a diaphragm 2 thereon. In the embodiment of the invention shown in FIG. 1, the diaphragm 2 is composed of a lower sheet 3 of chrysotile asbestos which rests on the cathode screen 1 and an upper mixed sheet 4, made of a mixture of amphibole asbestos and polyvinylidene fluoride fibers, which is bonded to sheet 3. In FIG. 2, a particularly preferred embodiment of the invention is illustrated, wherein the mixed sheet 2, composed of amphibole asbestos and polyvinylidene fluoride fibrils is sandwiched between and bonded to two sheets 3 and 5 of chrysotile asbestos.

The invention is further illustrated by the following examples which further illustrate the best mode currently contemplated for carrying out the invention, but which are not to be construed as limiting the invention in any manner.

EXAMPLES

The following six diaphragms according to the invention were prepared, each consisting of fibers of one variety of amphibole asbestos as indicated and fibrils of polyvinylidene fluoride.

| Diaphragm I | crocidolite | 80% |
|---|---|---|
| | fibrils | 20% |
| Diaphragm II | crocidolite | 60% |
| | fibrils | 40% |
| Diaphragm III | crocidolite | 50% |
| | fibrils | 50% |
| Diaphragm IV | crocidolite | 50% |
| | fibrils | 50% |
| Diaphragm V | crocidolite | 40% |
| | fibrils | 60% |
| Diaphragm VI | anthophyllite | 50% |
| | fibrils | 50% |

Preparation of Fibrils of Polyvinylidene Fluoride

The polyvinylidene fibrils may be produced in the following manner. A mixture of polyvinylidene fluoride and methylene chloride containing 100 g. of polyvinylidene fluoride per kg. of solution is heated to 180°C. and the pressure is regulated to 35 kg./cm.$^2$. At this pressure the mixture of polyvinylidene fluoride and methylene chloride is present as two phases. The two-phase liquid mixture is delivered to a die at a rate of 5 kg. of polymer/hr., wherein it is subjected to turbulent movement. Simultaneously, nitrogen, at a temperature of 20°C. and under a pressure of 40 kg./cm.$^2$ is injected into the die through the turbulent two-phase liquid mixture, at a flow rate of 20 normal m.$^3$ of nitrogen per hour. In the die, both the liquid mixture and nitrogen pass through a laminating orifice having a diameter of 2 mm. and a length of 1 mm., in order to subject the two-phase liquid mixture to an abrupt pressure release.

By operating under the foregoing conditions, 5 kg. of polyvinylidene fluoride fibrils per hour are produced, having a length of less than, or equal to 5 mm. and a specific surface area of 15 m.$^2$/g.

Preparation of the Diaphragms of the Invention

Each of the six diaphragms was made by the method of the invention as follows:

About 12.5 g. of the appropriate mixture of amphibole asbestos fibers (crocidolite or anthophyllite as the case may be) and polyvinylidene fluoride fibrils were dispersed in 3 liters of a 10% solution of alcohol in water. The homogeneous suspension thereby obtained was filtered so as to collect a filter cake consisting of a substantially hemogeneous mixture of fibers of amphibole asbestos and fibrils of polyvinylidene fluoride. The cake was dried in an oven at 100°C. and was then compressed between two platens within a former. During compression the cake was heated to a temperature of about 250°C., for about 10 minutes, so as to join together the fibrils of polyvinylidene fluoride and to ensure cohesion of the diaphragm. The diaphragm then had the form of a thin coherent sheet. The thickness and weight of the six diaphragms are shown in the following table.

| Diaphragm No. | Thickness mm. | Weight g./m.$^2$ |
|---|---|---|
| I | 0.5 | 560 |
| II | 0.75 | 400 |
| III | 0.75 | 390 |
| IV | 0.75 | 400 |
| V | 0.75 | 400 |
| VI | 0.75 | 500 |

These six diaphragms were submitted to testing as follows: (Tests 1 to 6):

Test 1

A laboratory electrolysis cell was employed, equipped with an anode and a cathode, each of these being rectangular and horizontal and having a surface area of about 1.5 dm.$^2$. The anode was made up of a series of parallel vanes of titanium covered with a catalytic coating containing ruthenium oxide. The cathode was a steel lattice and carried on its upper surface, facing the anode, the Diaphragm I described above. The anode-cathode distance was adjusted to 3 mm.

Sodium chloride brine was electrolyzed in this cell continuously for 83 days at a current density of 3.5 kA/m.$^2$. At the end of this period the diaphragm had not deteriorated and had not changed in shape or volume.

Test 2

The procedure of Test 1 was repeated using Diaphragm II. After a period of 41 days continuous operation, the current density was increased to 4 kA/m.$^2$. The electrolysis was stopped after 50 days operation. At the end of this period the diaphragm showed practically no deterioration nor deformation.

Test 3

The procedure of Test 1 was repeated using Diaphragm III and stopping the electrolysis after 31 days continuous operation, at the end of which the diaphragm had not deteriorated or deformed.

Test 4

A laboratory electrolysis cell was employed, having the form of a horizontal cylinder and equipped with a vertical anode and a vertical cathode, both circular. The anode consisted of a titanium plate of 78.5 cm.$^2$ surface area coated with a mixture of titanium dioxide and ruthenium oxide on the face turned towards the cathode. The cathode was a steel lattice of surface area 113 cm.$^2$. It carried the Diaphragm IV on its face turned towards the anode. The anode-cathode distance was adjusted to 10 mm.

Sodium chloride brine was electrolyzed in this cell continuously for 60 days at a current density of 4kA/m.$^2$ of anodic surface. At the end of this period the diaphragm had suffered no significant change.

Test 5

The procedure of Test IV was repeated using Diaphragm V. After a period of 14 days continuous electrolysis the diaphragm was still working and appeared unaltered.

Test 6

The procedure of Test IV was repeated using Diaphragm VI. At the end of 20 days operation the diaphragm had not deteriorated or suffered any change in shape or dimensions.

Test 7

In the manner described above, a mixed sheet was prepared containing, by weight, 40% of polyvinylidene fluoride fibrils and and having a thickness of 0.8 mm. The mixed sheet obtained was compressed between two sheets of chrysotile asbestos so as to reduce its thickness from 0.8 mm. to 0.3 mm. and was heated for 3 hours in an oven at 250°C. The two sheets of chrysotile asbestos were about 0.2 mm. thick each.

The diaphragm thereby obtained (Diaphragm VII) was tested in a electrolytic cell with a horizontal cathode of 32 dm.$^2$ and a foraminous titanium anode of 28 dm.$^2$ carrying a coating of ruthenium oxide. The anode-cathode distance was adjusted to 3 mm. An aqueous solution of sodium chloride was electrolyzed with an anodic current density of about 4.5 kA/m.$^2$.

At the end of the test, which lasted 74 days, the sheet of chrysotile asbestos which faced towards the anode was damaged by contact with the acid anolyte, but the working part of the diaphragm, consisting of the chrysotile asbestos sheet lying against the cathode and the mixed sheet formed out of the mixture of amphibole asbestos and fibrils of polyvinylidene fluoride was undamaged and maintained good cohesion and good stability of shape and dimensions.

In the following table there are listed the permeability figures for each of the Diaphragms I to VII during the preceding tests. Also recorded in the table are current density and the voltage across the electrodes.

| Diaphragm No. | Permeability (h⁻¹) | | | Duration of Test (Days) | | Current Density (kA/m²) | Electrolyzing Voltage (Volts) | |
|---|---|---|---|---|---|---|---|---|
| | Before Electrolysis | After Putting on load | Final | Before Putting on Load | Total | on Load | Maximum | Minimum |
| I | — | — | 1.200 | — | 83 | 3.5 | 3.5 | |
| II | 2.220 | — | 1.259 | — | 50 | (3.5 (4 | 3.70 | 3.30 |
| III | 3.512 | 1.956 | 1.776 | 9 | 31 | 3.5 | 3.56 | 3.44 |
| IV | 2.195 | 0.952 | 0.576 | 3 | 60 | 4 | 4.20 | 3.45 |
| V | 2.965 | 1.221 | 1.009 | 2 | 14 | 4 | 3.98 | 3.78 |
| VI | 3.770 | 1.294 | 0.739 | 4 | 21 | 5 | 3.90 | 3.46 |
| VII | 0.710 | — | 0.375 | — | 74 | 4.5 | 3.59 | 3.35 |

It is evident from the preceding table that the diaphragm according to the invention has a permeability distinctly higher than that of the diaphragms described in the aforesaid West German Patent Application No. 2,140,714, which contain a fluorinated resin dispersed between the asbestos fibers.

Diaphragms according to the invention find an advantageous application in horizontal diaphragm cells, for example in the electrolytic cell which is the subject of Belgian Patent No. 781,959 in the name of the present applicant.

What we claim as new and desire to secure by Letters Patent is:

1. A diaphragm for a cell for the electrolysis of an aqueous solution of an alkali metal halide comprising a mixed sheet formed of a substantially homogeneous mixture of fibers of amphibole asbestos and fibrils of polyvinylidene fluoride connected together, said fibrils having a three-dimensional network structure, a length of about 0.5 to 50 mm., a thickness of about 0.01 to 5 and a specific surface area greater than 1 m.²/g. and forming ribbons having a thickness of less than 4 u.

2. A diaphragm according to claim 1, wherein said asbestos fibers comprise fibers of crocidolite.

3. A diaphragm according to claim 1, wherein the said asbestos fibers comprise fibers of anthophyllite.

4. A diaphragm according to claim 1, wherein said mixed sheet comprises 10% to 80% by weight of fibrils of polyvinylidene fluoride.

5. A diaphragm according to claim 4, wherein said mixed sheet comprises 20% to 50% by weight of said fibrils.

6. A diaphragm according to claim 1, wherein the weight of said mixed sheet is between about 350 and about 650 g./m.² and the thickness between about 0.3 mm. and about 0.8 mm.

7. A diaphragm according to claim 1, wherein said mixed sheet is bonded to a sheet of chrysotile asbestos.

8. A diaphragm according to claim 7, wherein said sheet of crysotile asbestos has a thickness between about 0.2 mm. and about 0.5 mm. and a permeability between about 0.8 and about 3.5 liters per hour per dm.² of diaphragm surface at a head 1 dm. of aqueous sodium chloride solution.

9. A diaphragm according to claim 1, wherein said mixed sheet is sandwiched between two sheets of chrysotile asbestos and is bonded to said two sheets.

10. A diaphragm according to claim 9, wherein each sheet of crysotile asbestos has a thickness between about 0.2 mm. and about 0.5 mm. and a permeability between about 0.8 and about 3.5 liters per hours per dm.² of diaphragm surface at a head 1 dm. of aqueous sodium chloride solution.

11. A diaphragm according to claim 1, wherein said asbestos fibers are selected from anthophyllite and crocidolite fibers in an amount of 40–80% by weight and in which, the thickness of said diaphragm is from about 0.5 to 0.75 mm. and the weight is about 390 to 560 g./m.².

12. A diaphragm according to claim 1 wherein the surface of said fibrils is fused.

* * * * *